United States Patent [19]
Barbee

[11] 3,726,140
[45] Apr. 10, 1973

[54] LIQUID LEVEL INDICATING MEANS
[75] Inventor: Gail G. Barbee, Aurora, Ill.
[73] Assignee: Caterpillar Tractor Co., Peoria, Ill.
[22] Filed: June 7, 1971
[21] Appl. No.: 150,644

[52] U.S. Cl. ................................73/299, 73/392
[51] Int. Cl. ...................................G01f 23/14
[58] Field of Search ..................73/299, 302, 392

[56] References Cited

UNITED STATES PATENTS

| 827,318 | 7/1906 | Martin | 73/302 |
| 1,646,957 | 10/1927 | Eynon | 73/299 |
| 1,055,099 | 3/1913 | Sullivan | 73/299 |
| 1,646,311 | 10/1927 | Page | 73/299 |

FOREIGN PATENTS OR APPLICATIONS

| 653,316 | 3/1929 | France | 73/299 |
| 586,672 | 3/1947 | Great Britain | 73/299 |
| 425,408 | 9/1947 | Italy | 73/299 |

Primary Examiner—S. Clement Swisher
Assistant Examiner—Denis E. Corr
Attorney—Fryer, Tjensvold, Feix, Phillips & Lempio

[57] ABSTRACT

A closed fuel tank comprises a liquid level indicating means having a transducer cell mounted adjacent the bottom thereof. The cell comprises a bottom wall having a centrally disposed opening formed therein to communicate fuel to an internal, air-filled chamber of the cell. A tube forms an extension of the opening and extends downwardly from the bottom wall to form a "bubble trap." A perforated baffle member encapsulates the tube to retard ingress of fuel into the chamber to prevent pressure surges therein. The air pressure level in the cell, proportional to the head of fuel in the tank, is communicated to a calibrated fuel gage mounted externally of the tank.

11 Claims, 5 Drawing Figures

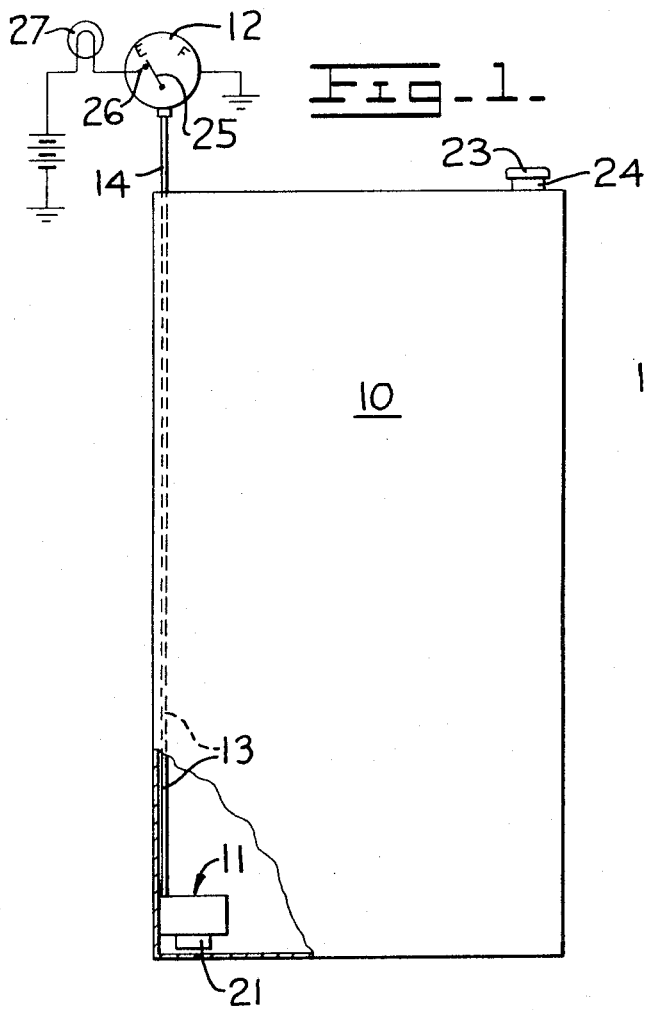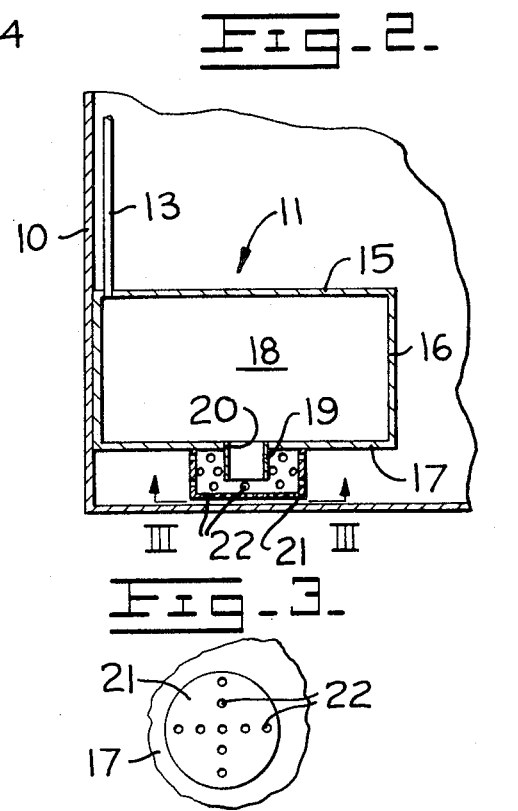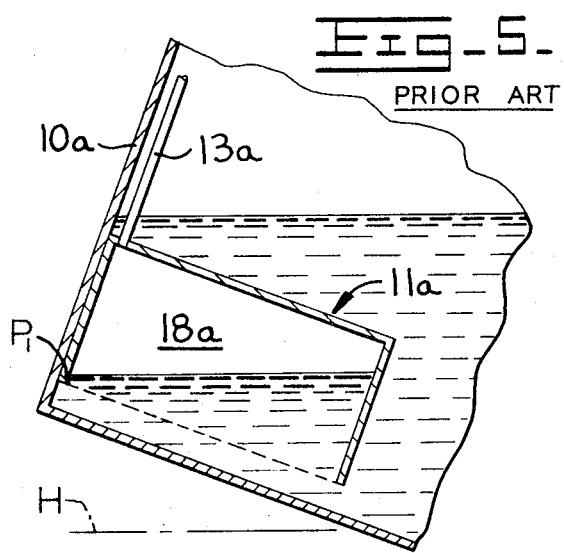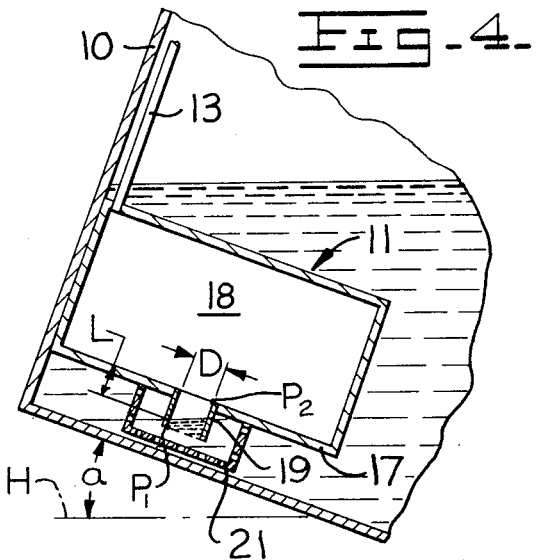

LIQUID LEVEL INDICATING MEANS

BACKGROUND OF THE INVENTION

This invention relates to liquid level indicating means comprising a transducer cell and sending unit for translating the head of liquid in a tank to an air pressure signal and for transmitting same to a pressure and fuel gage.

A number of conventional fuel level indicating devices utilize a trapped air system for indicating the level of fuel contained in a fuel tank. Such system normally constitutes a cell, in the form of an inverted container having a completely open bottom, which is mounted within the tank. As the fuel level rises, the pressure of air trapped in the cell increases a proportional amount to generate a pressure signal which is transmitted to a calibrated pressure gage.

Mobile vehicles, such as earth working equipment, frequently operate on uneven terrain, side slopes, hills, etc., causing their fuel tanks to tilt relative to ground level. When such tilting becomes excessive, the conventional opened bottom cell permits trapped air to escape therefrom. Fuel thereafter replaces the displaced air when the vehicle returns to its normal level position. Such an interchange functions to transmit a false reading to the fuel gage to induce the vehicle to run out of fuel during an earth working operation.

Another problem encountered with the opened bottom type of cell is one occasioned due to side-to-side sloshing of fuel in the tank, particularly when the tank is near empty. Such sloshing generates pressure surges of high magnitude which tend to damage delicate mechanisms employed in the pressure gage and effect an erratic reading thereon.

SUMMARY AND OBJECTS OF THE INVENTION

An object of this invention is to overcome the above, briefly described problems by providing an economical and highly accurate liquid level indicating means for tanks, which is substantially insensitive to pronounced tipping of the tank relative to ground level and to sloshing of the fuel therein.

The indicating means comprises a transducer cell adapted to be attached adjacent the bottom of a fuel tank or the like. A relatively small opening is formed through a bottom wall of the transducer and spaced a substantial distance from sidewalls thereof to communicate the head of liquid fuel to an air-conditioning chamber of the transducer. Variations in such head will in turn vary the air pressure in the transducer which is reflected on a fuel gage. In the preferred embodiment, a tube forms an extension of the opening and baffle means encapsulate the tube to dampen pressure surges therearound.

BRIEF DESCRIPTION OF THE DRAWINGS

Other objects of this invention will become apparent from the following description and accompanying drawings wherein:

FIG. 1 is a side elevational view of a tank which is sectioned to expose a liquid level indicating means embodiment of this invention operatively associated therewith;

FIG. 2 is an enlarged, cross-sectional view of a transducer cell employed in the indicating means;

FIG. 3 is a partial, bottom plan view of the transducer cell, taken in the direction of arrows III—III in FIG. 2;

FIG. 4 is a view similar to FIG. 2, but showing the transducer cell in a tilted position relative to ground level; and FIG. 5 is a view illustrating a prior art cell in a corresponding tilted position.

DESCRIPTION OF THE PREFERRED EMBODIMENTS

FIGS. 1–3 illustrate a preferred liquid level indicating means embodiment of this invention, attached to a conventional tank 10 defining a closed chamber therein adapted to contain a liquid such as diesel fuel. The indicating means comprises a sending unit or transducer cell 11 suitably mounted on a sidewall of the tank and near the bottom thereof. The transducer cell is operatively connected to an externally-mounted pressure gage means 12 by a conduit 13 extending from the top of the transducer to the top of the tank and an extension conduit 14 positioned externally of the tank.

The transducer cell comprises a substantially closed housing formed by suitably connected top, side and bottom walls 15–17, respectively. The housing, when viewed in top-plan, is preferably circular although other shapes such as rectangular (e.g., square) could be employed therefor. The housing defines an air chamber 18 therein which has a predetermined volume substantially less than that of tank 10.

A tube 19, preferably cylindrical, is attached to and forms an extension of an opening 20 formed through bottom wall or plate 17. The opening is spaced at a substantial distance from the sidewalls and is preferably centrally located on the bottom wall. The area of the opening is substantially less than the area of the bottom plate (e.g., approximately 1:10) with the opening illustrated having an area which approximates 11.5 percent of the area of the bottom wall.

A cylindrical, perforated cap 21, secured to the bottom wall, encapsulates the tube. A typical array of perforations 22 is illustrated in FIG. 3. The cap functions as a baffle means to dampen pressure surges therearound as will be hereinafter described.

Typically, tank 10 is filled with a liquid fuel, such as gasoline or diesel fuel, by removing a cap 23 from a filler spout 24 connected to the top of the tank. As the fuel level rises around the transducer cell, fuel passes through perforated cap 21, but will not enter chamber 18 due to the air trapped therein. As the fuel level continues to rise, the air pressure in chamber 18 and conduits 13 and 14 rises a proportionate amount to indicate same on calibrated pressure and fuel gage 12.

In the case of diesel fuel, commonly used in engines employed on large earthmoving vehicles, the air pressure will increase approximately one-half ounce per square inch for each inch of rise of the fuel head. Thus, if a fuel tank 50 inches deep is completely filled with diesel fuel, the air pressure in chamber 18 and conduits 13 and 14 would be approximately 25 ounces per square inch. Since the depth of the fuel tank will usually vary with the size of the vehicle, the gages will necessarily be calibrated accordingly. However, identical transducer cells 11 can be used in connection with all such tanks regardless of their depth.

FIG. 4 shows a near-empty tank in a tilted position wherein bottom plate 17 of the transducer cell, for example, is at a tilt angle $a$ relative to a horizontal plane or ground level H. Such tilting normally occurs when a vehicle is operated on a grade or side slope. When the tank is tilted to the position shown, a negligible amount of air has already leaked past point $P_1$ and has been replaced in tube 19 by a like volume of fuel. So long as point $P_1$ remains vertically below point $P_2$, fuel will be prevented from entering chamber 18.

Tube 19 and opening 21 thus cooperate to function as a "bubble trap" to prevent air from escaping from chamber 18 to distort the reading on gage 12. The small volume of air-replaced-by-fuel in the tube is too minute to affect the calibration of the gage. Tube 19 is constructed and dimensioned so that the volume of air in chamber 18 remains intact when the vehicle is operated on side slopes or grades which can be safely negotiated.

Such dimensions, when applied to a tube having a circular cross-section, may be calculated in accordance with the formula $a_{max} = $ Arc Tan $(L/D)$. In such formula, $a_{max}$ equals the maximum tilt angle (FIG. 4) at which the vehicle can be safely operated and $L$ and $D$ equal the length and inner diameter, respectively, of the tube. The angle $a_{max}$ also defines the maximum angle ($a$ in FIG. 4) at which bottom wall 17 can be tipped relative to horizontal plane H without permitting liquid in tank 10 from entering air chamber 18.

For example, the FIGS. 1–4 tube is dimensioned so that angle $a_{max}$ equals 45°. In accordance therewith, point $P_1$ will remain below point $P_2$ so long as the tank is not tilted beyond 45° relative to ground level H, to prevent the ingress of fuel into chamber 18. Should the tank be tilted inadvertently beyond the 45° inclination, to allow air to escape from chamber 18 and to allow the ingress of fuel therein, the fuel can be easily drained from the chamber simultaneously along with a draining of the fuel tank.

FIG. 5 illustrates a prior art, open bottom type of cell 11a which has been tilted to the same degree as cell 11 in FIG. 4. As a tank 10a is tilted, the air from a chamber 18a of the cell escapes at point $P_1$ and is replaced by fuel. Comparing the two figures, it can be readily seen that a substantial volume of fuel enters the prior art cell under identical tilt angles. When tank 10a is returned to a level position, the fuel will remain in the cell to induce a false reading on a fuel gage (not shown) attached to a sensing conduit 13a.

A primary function of perforated cap member or baffle means 21 is to inhibit the sloshing effect of the fuel around opening 20, particularly when the fuel tank is near empty. Thus, pressure surges are damped and minimized and damage to the gage is prevented. Also, the damping of such pressure surges by the baffle means will stabilize the needle of gage 12 which might otherwise fluctuate rapidly to provide an erratic reading.

Gage 12 (FIG. 1) may have its needle 25 function as a normally open switch which closes on a contact 26 to provide means for visually indicating when the needle closely approaches the empty (E) reading. Closing of the switch completes an electrical circuit to light a bulb 27 located on the vehicle's dashboard (not shown) to alert the operator prior to stalling of the vehicle.

It should be understood that tube 19 and/or baffle means 21, although preferred, could be eliminated from the indicating means in certain applications. Opening 20 would still function to provide a much more accurate reading on gage 12 than would the FIG. 5 prior art system. In particular, although some fuel would enter chamber 18 when it assumes the FIG. 4 position, the volume thereof would be substantially less than the volume of fuel contained in chamber 18a of the FIG. 5 conventional cell.

What is claimed is:

1. A liquid level indicating means adapted for use with a closed tank comprising
   a transducer cell having connected top, bottom, and side walls defining an air chamber of predetermined volume therein,
   means forming an opening through said bottom wall which is spaced a substantial distance from said side walls and has an area substantially less than the area of said bottom wall,
   gage means operatively connected to said transducer cell for sensing and indicating variable air pressure levels in said air chamber and
   baffle means, comprising a perforated cap, attached exteriorly on said bottom wall to completely cover said opening to dampen pressure surges of liquid thereat.

2. The invention of claim 1 further comprising a tank defining a liquid chamber therein having a volume substantially greater than said air chamber, said transducer cell mounted in said liquid chamber adjacent to a bottom of said tank and said gage means positioned externally of said tank whereby the variable air pressure indicated by said gage means is responsive to the head of liquid contained in said liquid chamber.

3. The invention of claim 2 further comprising means operatively connected to said gage means for visually indicating when the liquid in said tank falls below a predetermined level.

4. The invention of claim 3 wherein said means operatively connected to said gage means comprises an electrical circuit having a movable needle of said gage means forming a normally open switch thereof.

5. The invention of claim 1 further comprising a tube attached to and extending away from said bottom wall to form an extension of said opening.

6. The invention of claim 5 wherein said tube is cylindrical and is constructed in accordance with the formula $a_{max} = $ Arc Tan $(L/D)$ wherein:
   $a_{max}$ = The maximum angle at which said bottom wall of said transducer cell can be tipped relative to a horizontally disposed plane without permitting a liquid in said tank from entering the air chamber of said transducer cell;
   $L$ = The vertical length of said tube; and
   $D$ = The inner diameter of said tube.

7. The invention of claim 6 wherein $a_{max}$ is no greater than approximately 45°.

8. The invention of claim 1 further comprising a tube attached to and extending away from said bottom wall to form an extension of said opening, said baffle means encapsulating said tube.

9. The invention of claim 1 wherein said opening has an area approximating one-tenth of the area of said bottom wall.

10. The invention of claim 1 wherein said opening is at least approximately located at the center of said bottom wall.

11. A liquid level indicating means adapted for use with a closed tank comprising
- a transducer cell having connected top, bottom, and side walls defining an air chamber of predetermined volume therein,
- means forming an opening through said bottom wall which is spaced a substantial distance from said side walls and has an area substantially less than the area of said bottom wall,
- gage means operatively connected to said transducer cell for sensing and indicating variable air pressure levels in said air chamber;
- baffle means attached exteriorly on said bottom wall to completely cover said opening to dampen pressure surges of liquid thereat and
- a tube attached to and extending away from said bottom wall to form an extension of said opening, said baffle means encapsulating said tube.

* * * * *